United States Patent [19]

Meeker

[11] Patent Number: 4,912,818
[45] Date of Patent: Apr. 3, 1990

[54] BELT ADJUSTING APPARATUS

[75] Inventor: Paul K. Meeker, Aurora, Ohio

[73] Assignee: Spalding & Evenflow Companies, Inc., Tampa, Fla.

[21] Appl. No.: 371,361

[22] Filed: Jun. 26, 1989

[51] Int. Cl.⁴ .............................................. A47C 31/00
[52] U.S. Cl. ...................................... 24/170; 297/250; 297/484; 24/17 B
[58] Field of Search ................. 24/170, 68 CD, 68 R, 24/17 B, 19, 115 K, 115 H, 16 R, 585; 297/250, 484, 476, 483

[56] References Cited

U.S. PATENT DOCUMENTS

| | | | |
|---|---|---|---|
| D. 285,383 | 9/1986 | Anthony | D2/405 |
| 393,090 | 11/1888 | Youmans | 24/170 |
| 1,088,373 | 2/1914 | Russell . | |
| 1,361,647 | 12/1920 | Vaisset . | |
| 1,847,785 | 3/1932 | Reynolds . | |
| 2,191,210 | 2/1940 | Johnson | 36/71 |
| 2,394,523 | 2/1946 | Pancoe | 297/484 |
| 2,690,601 | 10/1954 | Van Buren, Jr. | 24/78 |
| 2,996,779 | 8/1961 | Marker | 24/170 |
| 3,020,612 | 2/1962 | Meeker | 24/170 |
| 3,063,116 | 11/1962 | Mihalyi | 24/170 |
| 3,177,545 | 4/1965 | Svensson | 24/170 |
| 3,696,471 | 10/1972 | Mermelstein | 24/193 |
| 4,411,473 | 10/1983 | Ettridge | 297/484 |
| 4,674,155 | 6/1987 | Turtle et al. | 24/170 |
| 4,689,858 | 9/1987 | Barber | 24/17 B |
| 4,720,148 | 1/1988 | Anthony et al. | 297/474 |
| 4,727,428 | 3/1988 | Rudholm | 24/170 |
| 4,770,468 | 9/1988 | Shubin | 297/484 |

Primary Examiner—Victor N. Sakran
Attorney, Agent, or Firm—Donald R. Bahr; John E. Benoit

[57] ABSTRACT

Belt adjusting apparatus for use on an infant or toddler seat is disclosed which comprises an interlocking assembly of geometrically-configured metal plates, each having at least one slot therein, with a belt passing through the slots in a specific path so that the belt is freely moved in one direction when in a locked position so as to tighten said belt, but cannot be moved in the other direction without manually adjusting the relative position of the metal plates. A spring return may be used to maintain the position of the plates in a locked position.

10 Claims, 2 Drawing Sheets

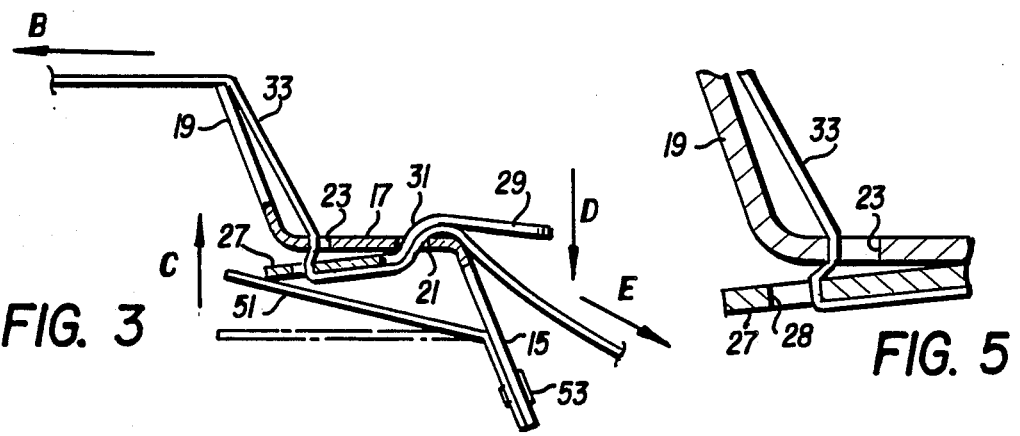
FIG. 3
FIG. 5
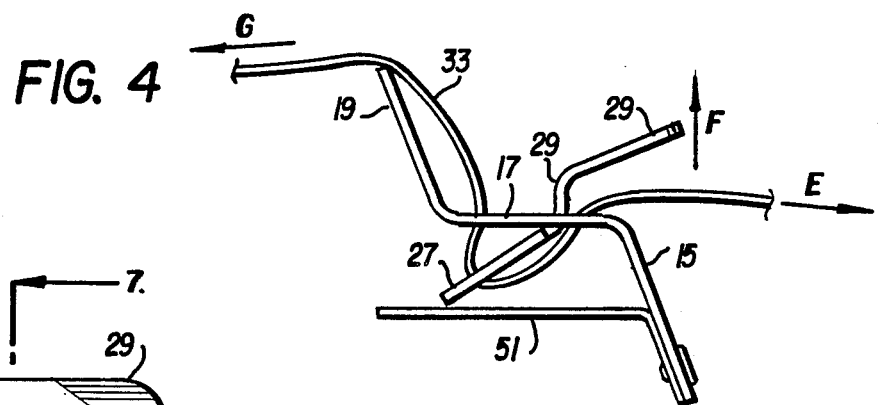
FIG. 4
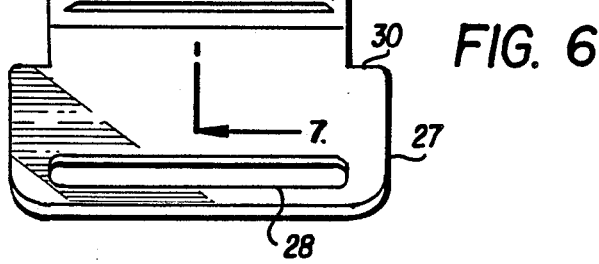
FIG. 6
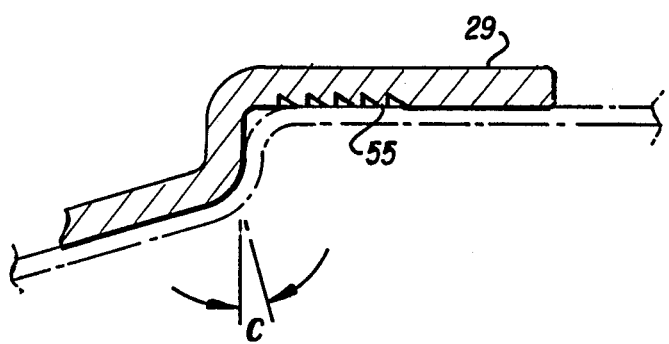
FIG. 7

BELT ADJUSTING APPARATUS

This application relates generally to apparatus used for adjusting belt length, and more specifically to apparatus designed for adjusting seat belts in infant and toddler car seats.

BACKGROUND OF THE INVENTION

Belt adjusting devices are generally used in many applications and more specifically in the use of adjusting seat belts in vehicles and in infant and toddler car seats. The basic concept in all these adjusting devices is to allow the user to tighten the belt system, including shoulder straps and the like, about a toddler with a single pull on the end of a strap. Various devices have been proposed and are in use for accomplishing this purpose, and most of these devices require a plurality of parts and particular construction of the parts. This leads to complicated manufacturing techniques and often prevents the use of alternate sources for the equipment due to the economics of manufacturing the parts.

Accordingly, it is an object of the present invention to provide a belt adjusting apparatus which provides ease of use at a lower cost than existing adjusting mechanisms.

A further object of the present invention is to provide a belt-adjusting apparatus which uses low precision components which are fewer in number and may all be made with the same stamping technology.

Yet another object of the present invention is to provide a belt adjusting apparatus which comprises an interlocking assembly of two metal stampings with a belt passing in a specific path through the two stampings.

Still another object of the present invention is to provide a belt adjusting apparatus which comprises two separate metal stampings and which may be easily and conveniently used in conjunction with toddler or infant seats.

These and other objects of the invention will become obvious from the following description taken together with the accompanying drawings.

SUMMARY OF THE INVENTION

The present invention provides a belt adjusting apparatus for use with an infant or toddler seat which comprises an interlocking assembly of two geometrically-configured metal plates, each having at least one slot therein, with a belt passing through the slots in a specific path so that the belt is freely movable in one direction for tightening when in a locked position, but cannot be moved in the other direction without manually adjusting the relative position of the metal plates to an unlocked position. A spring return may be used to maintain the position of the plates in a locked or secure position.

BRIEF DESCRIPTION OF THE DRAWINGS

FIG. 3 is a partial side sectional view of the apparatus of FIG. 1;

FIG. 4 is a partial sectional view of the apparatus of FIG. 1 in an unlocked position, as opposed to the locked position of FIG. 3;

FIG. 5 is an enlarged view of a section of the apparatus of FIGS. 3 and 4;

FIG. 6 is a plan view of one of the plates of the apparatus shown in FIGS. 3 and 4; and FIG. 7 is an enlarged sectional view taken along the lines 7—7 of FIG. 6.

DETAILED DESCRIPTION OF THE PREFERRED EMBODIMENT

Figure 1:
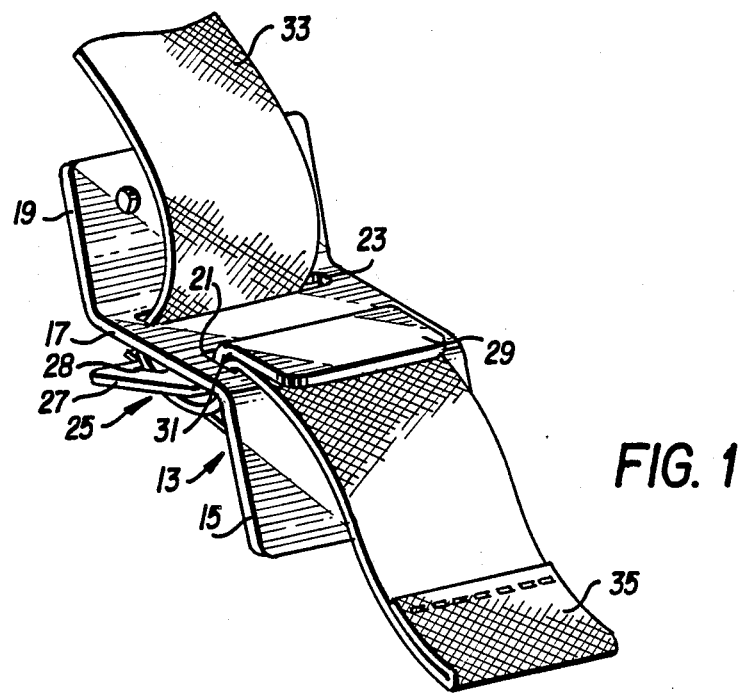
FIG. 1 is a perspective view of the belt adjusting apparatus of the present invention.

Referring to FIG. 1, there is shown a belt adjusting apparatus configured in compliance with the present invention. A first plate 13, having a general "Z" configuration, includes one end section 15, central section 17, and an opposite end section 19. The end sections extend angularly from the central section in order to conform to the seat to which they are adapted to be used, as will be discussed as the description proceeds.

Central section 17 includes slots 21 and 23, spaced so as to be located substantially near the opposed outer ends of section 17.

Adjuster clamp 25 includes plate 27 and plate 29, with plate 29 being offset from plate 27 at a predetermined angle. Adjuster clamp 25 includes slot 28 near the outer end of plate 27. Central section 31 angularly interconnects plate 27 with plate 29. Belt 33 is threaded through the various slots in the plates, as will be described, and terminates at one end in a folded section 35, which prevents the end of the belt from being pulled through the slots.

Figure 2:
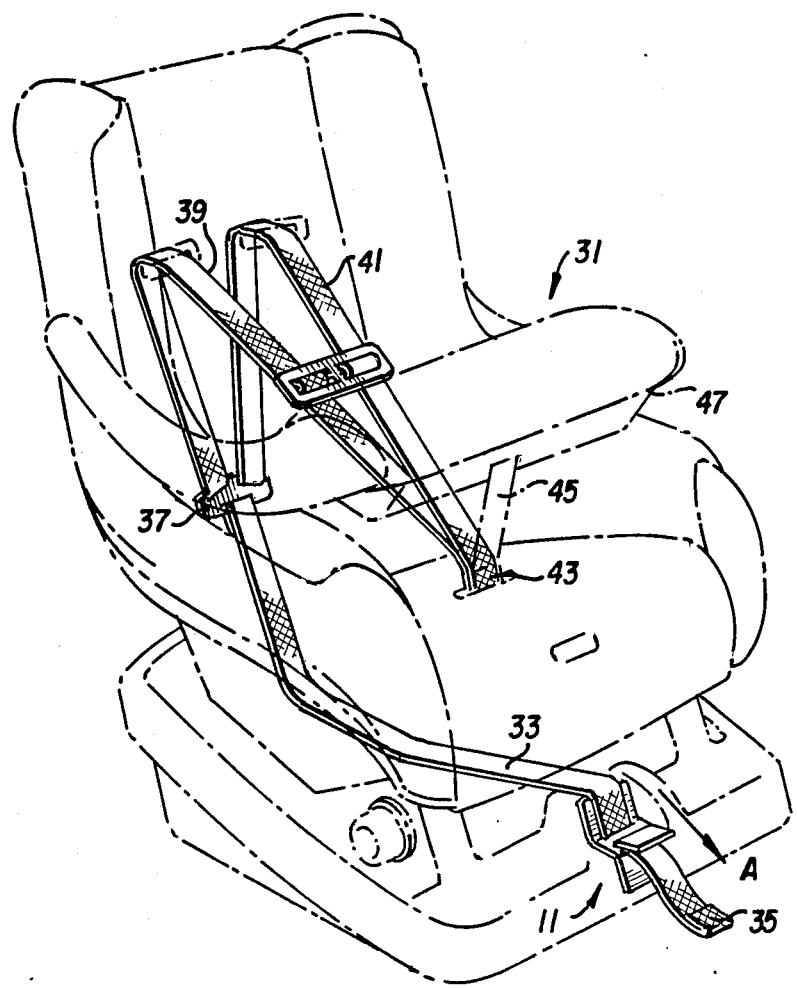
FIG. 2 is a perspective view of the belt adjusting apparatus in place with an infant seat (as shown in phantom)

FIG. 2 shows belt adjusting apparatus 11 in place on a child's car seat, which is shown in phantom to more clearly illustrate the manner in which the apparatus is used with the seat. Belt 33 extends rearwardly under the seat and is secured to steel plate 37, which in turn is secured to the terminal ends of shoulder straps 39 and 41. The other ends of shoulder straps 39 and 41 terminate and are secured to male latch member 43, which is also secured to crotch strap 45. In the position shown, male member 43 has been secured to the female latch member (not shown) in the car seat. Button 44 is depressed to release male member 43. Once the child is placed in the seat and the arm rest is lowered, male member 43 is secured to the female member of the latch. Belt 33 is then grasped by its end 35 and pulled in the direction of arrow A, which tightens the shoulder straps.

FIG. 3 is a partial sectional view showing the belt adjusting apparatus in its locked position. End plate 19 of adjuster frame 13 has been secured to the seat in the position illustrated in FIG. 2 by means of bolts or the like (not shown) passing through boreholes 20, FIG. 1. The belt has been pulled in the direction of the arrow E so as to tighten the belt as previously described. Since the belt passes through slot 21, beneath adjuster clamp 25, through slot 28 of adjuster clamp 25, and through slot 23 of adjuster frame 13, the pressures created by the belt tension in its locked position are as follows: Adjuster clamp 25 is moved clockwise about central section 31 so that plate 27 moves in the direction of arrow C and plate 29 moves in the direction D. This secures belt 33 in the position shown, since the belt cannot be moved in the direction of arrow B with the adjuster in the locked position shown in FIG. 3.

In order to maintain the adjuster in the locked position shown in FIG. 3, spring steel member 51 is secured to lower plate 15 of adjuster frame 13 by means such as a rivet 53. Preferably, the spring extends as shown in the solid lines to bear against the end of plate 27 of adjuster clamp 25 so as to bias the belt adjusting apparatus in the locked position. It should be noted, however, that the apparatus will still operate even if the spring extends away from plate 27 as shown in the dotted lines. In this instance, it does not act as a bias to maintain the adjuster in a locked position, but does prevent rotation of adjuster clamp 25 in a counterclockwise direction and prevents the clamp from falling free of adjuster frame 13.

If plate 29 of adjuster clamp 25 is raised by means of a finger or the like in the direction of arrow F, it automatically lowers rear section 27 in the direction of arrow G, which effectively moves adjuster clamp 25 counterclockwise. This removes any pressure by plate 29 against the belt and, thus, allows it to be freely movable in the direction G as well as the direction E. This, of course, unlocks the apparatus and provides a release of the belt for removing the child from the seat.

To further enhance the locking action of the belt adjuster, knurled section 53 is grooved into plate 29 of adjuster clamp 25, as shown in FIGS. 6 and 7. Knurled section 53 effectively bites into the belt when adjusting apparatus 11 is in the locked position of FIG. 3, as is more clearly illustrated in FIG. 7. Also illustrated in FIG. 7 is the angle φ between plates 27 and 29. This is preferably substantially 22° in order to obtain optimum action by the adjusting apparatus.

FIG. 5 is an enlarged view to show the effect of securing the belt in the locked position. As can be seen from FIG. 6, adjuster clamp 25 includes plate 29, which is reduced in cross-section to allow it to pass through slot 21 in adjuster frame 13. Shoulder 30 bears against the underside of central section 17 of adjuster frame 13 so as to prevent further passage of adjuster clamp 25 through slot 21. As illustrated in FIG. 5, the distance between the reduced section shoulder 30 and slot 28 is greater than the distance between slots 21 and 23 of adjuster frame 13. This ensures that slot 28 extends rearwardly of slot 23 so as to provided the looped configuration of belt 33 as shown in FIG. 5. This forces a tightening of the belt, which lifts the rear of plate 27 in the direction of arrow C of FIG. 3 so as to place the adjusting apparatus in the locked position.

It will now be evident that the present belt adjusting apparatus includes simplified means for providing a locked and unlocked position of the belt clamp. By using only two stamped pieces of metal, the construction of the adjusting apparatus has been greatly simplified. Further, the apparatus has a triple locking mechanism effect. As force is applied to the system in attempting to pull the car seat looser, the adjusting apparatus tightens its grip on the belt. It accomplishes this by three distinct mechanisms:

The first mechanism is by a rear "kinked" path. As the belt tightens, the adjuster clamp pivots at the point it passes through the adjuster frame and makes a tighter and more "kinked" path for the belt as it passes through the rear path of both stampings.

The second force is at the front of the adjuster, where both the belt and the adjuster clamp pass through the adjuster frame. As the belt tightens, the geometry of the rear "kink" path drives the adjuster clamp forward and pinches the belt between the adjuster clamp and the adjuster frame.

A third effect operates at the front of the adjuster frame. As the adjuster clamp pivots and the "kink" path becomes sharper, the belt becomes squeezed where it exits from the front of the adjuster frame. The tighter the "kink" becomes, the more the belt gets squeezed near the front of the adjuster. With the addition of the knurled area, this further secures the belt in the proper position.

Although these three effects act separately and could be engineered to act alone, they act to enhance each other. By acting in concert, they provide a secure, easy means to control the mechanism which locks the belt.

The above description and drawings are illustrative, only, since the apparatus could be modified without departing from the invention, which is to be limited only by the scope of the following claims.

I claim:
1. Belt adjusting apparatus comprising
   a first substantially flat plate having opposed ends extending angularly therefrom;
   a first slot extending through and laterally across a portion of said first flat plate;
   a second slot extending through and laterally across a portion of said first flat plate and spaced a predetermined distance from said first slot;
   a second substantially flat plate wider than said first slot in said first flat plate and terminating in a reduced section narrower than said first slot;
   a third substantially flat plate integral with said reduced section and extending angularly therefrom, said reduced section passing through said first slot in said first flat plate, said third flat plate being in opposed relation to a portion of said first flat plate;
   a third slot extending through and laterally across a portion of said second flat plate, said slot being at a greater distance from said reduced section than the distance between said first and second slots in said first flat plate; and
   a belt passing between said third flat plate and said first flat plate, through said first slot in said first flat plate, through said third slot in said second flat plate, and through said second slot in said first flat plate.

2. The belt adjusting apparatus of claim 1 further comprising a knurled area on said third flat plate in the area where it is opposed to said first flat plate.

3. The belt adjusting apparatus of claim 1 wherein said reduced section extends from said third flat plate at an angle of substantially 22°.

4. The belt adjusting apparatus of claim 1 further comprising
   a spring secured at one end to one of said opposed ends of said first plate, said spring bearing against said second plate so as to bias said third plate against said belt and said first plate.

5. The belt adjusting apparatus of claim 1 further comprising means secured to one of said opposed ends of said first plate and extending substantially adjacent said second plate so as to limit the movement of said second plate.

6. Belt adjusting apparatus comprising
   a first substantially flat plate having opposed ends extending angularly therefrom;
   a first slot extending through and laterally across a portion of said first flat plate;
   a second slot extending through and laterally across a portion of said first flat plate and spaced a predetermined distance from said first slot;

a second flat plate terminating in a reduced section extending angularly therefrom, said reduced section passing through and rotatable about said first slot in said first flat plate;

a third slot extending through and laterally across a portion of said second flat plate, said slot being at a greater distance from said reduced section than the distance between said first and second slots in said first flat plate; and a belt passing between said third plate and said first plate, through said first slot in said first plate, through said third slot in said second plate, and through said second slot in said first plate.

7. The belt adjusting apparatus of claim 6 further comprising a knurled area on said reduced section in the area where it is opposed to said first flat plate.

8. The belt adjusting apparatus of claim 6 wherein said reduced section extends from said second plate at an angle of substantially 22°.

9. The belt adjusting apparatus of claim 6 further comprising a spring secured at one end to one of said opposed ends of said first plate, said spring bearing against said second plate so as to bias said reduced section against said belt and said first plate.

10. The belt adjusting apparatus of claim 6 further comprising means secured to one of said opposed ends of said first plate and extending substantially adjacent said second plate so as to limit the movement of said second plate.

* * * * *